(12) United States Patent
Kihara et al.

(10) Patent No.: US 7,770,556 B2
(45) Date of Patent: Aug. 10, 2010

(54) MULTI-HOLE INJECTOR, IN-CYLINDER GASOLINE INJECTION TYPE INTERNAL COMBUSTION ENGINE AND CONTROL METHOD FOR THE ENGINE

(75) Inventors: Yusuke Kihara, Hitachinaka (JP); Yoshihiro Sukegawa, Hitachi (JP); Kenji Tsuchita, Hitachiota (JP); Sumie Tsuchita, legal representative, Hitachiota (JP); Hiroshi Fujii, Tokyo (JP); Atsushi Sekine, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/178,299

(22) Filed: Jul. 23, 2008

(65) Prior Publication Data

US 2009/0025680 A1    Jan. 29, 2009

(30) Foreign Application Priority Data

Jul. 24, 2007    (JP) .............................. 2007-191534

(51) Int. Cl.
*F02B 3/00*    (2006.01)
(52) U.S. Cl. ................................. 123/299; 239/265.25
(58) Field of Classification Search ................. 123/276, 123/295, 298–300, 305, 193.4, 193.6; 239/265.25, 239/533.11, 533.12, 585.1, 585.4, 585.8
See application file for complete search history.

(56) References Cited

U.S. PATENT DOCUMENTS

| | | | | |
|---|---|---|---|---|
| 5,305,720 A * | 4/1994 | Ando et al. | ............... | 123/193.4 |
| 5,913,960 A * | 6/1999 | Fletcher-Jones | ............... | 92/219 |
| 6,345,601 B1 * | 2/2002 | Miyajima et al. | ........... | 123/305 |
| 6,666,387 B2 * | 12/2003 | Kubo | .................... | 239/533.12 |
| 6,789,752 B2 * | 9/2004 | Dantes et al. | .......... | 239/533.12 |
| 7,080,796 B2 * | 7/2006 | Tomiita | .................. | 239/533.12 |
| 7,383,812 B2 * | 6/2008 | Katou et al. | ................ | 123/305 |

(Continued)

FOREIGN PATENT DOCUMENTS

JP    57-95472    6/1982

(Continued)

OTHER PUBLICATIONS

Japanese Office Action and translation thereof dated Jun. 30, 2009—6 pages.

(Continued)

*Primary Examiner*—Willis R. Wolfe, Jr.
*Assistant Examiner*—Johnny H Hoang
(74) *Attorney, Agent, or Firm*—Crowell & Moring LLP

(57) ABSTRACT

Improvement of combustion stability in retard ignition at the time of starting in a cold state, high output in a full throttle condition, reduction of smoke, and prevention of wear of the cylinder liner caused by oil dilution, are to be attained. In connection with the flow of fuel into each hole and a fuel inflow angle which is determined by the axis of each hole formed in a plate, the fuel inflow angle of an hole directed to a spark plug is set large to reduce an effective flow path area, thereby making the amount of fuel in the hole smaller than in other holes. A shallow cavity is formed in a piston crown face and a small prominence confronting fuel sprays is formed within the cavity.

14 Claims, 18 Drawing Sheets

U.S. PATENT DOCUMENTS

| | | | |
|---|---|---|---|
| 2006/0102141 A1* | 5/2006 | Nakayama et al. | 123/298 |
| 2007/0079797 A1* | 4/2007 | Kihara et al. | 123/298 |
| 2007/0095947 A1* | 5/2007 | Sivieri | 239/533.12 |

FOREIGN PATENT DOCUMENTS

| | | |
|---|---|---|
| JP | 2-64766 | 5/1990 |
| JP | 2000-38974 | 2/2000 |
| JP | 2005-139989 A | 6/2005 |
| JP | 2006-144647 | 6/2006 |
| JP | 2007-107436 | 4/2007 |

OTHER PUBLICATIONS

Japanese Office Action dated Dec. 8, 2009 and translation (4 pages).

* cited by examiner

C-C SECTION

D-D SECTION

MULTI-HOLE INJECTOR, IN-CYLINDER GASOLINE INJECTION TYPE INTERNAL COMBUSTION ENGINE AND CONTROL METHOD FOR THE ENGINE

CLAIM OF PRIORITY

The present application claims priority from Japanese patent application serial no. 2007-191534 filed on Jul. 24, 2007, the contents of which are hereby incorporated by reference into this application.

FIELD OF THE INVENTION

The present invention relates to a multi-hole injector having a plurality of nozzle holes, in-cylinder gasoline injection (direct gasoline injection) type internal combustion engine having the multi-hole injector, and a method for controlling the engine.

BACKGROUND OF THE INVENTION

In a conventional in-cylinder gasoline injection type internal combustion engine provided with multi-hole injector, for example in Japanese Patent Laid-Open Publication No. 2005-139989, it is proposed that nozzle holes in the injector vary in radius of a curved surface of each nozzle hole's inlet portion so that penetrations of fuel sprays from the nozzle holes vary in penetration.

For an in-cylinder gasoline injection type internal combustion engine, it may be required to carry out an ignition retard combustion method wherein ignition timing is made later than a top dead center in a fast idle condition at the time of starting in a cold state to lower combustion efficiency intentionally and raise an exhaust gas temperature. In the ignition retard combustion, it is necessary to concentrate an air-fuel mixture around a spark plug in order to ensure stable combustion, and a fuel spray injected from each nozzle hole is supplied into the associated cylinder by means of an injector which is directed to the vicinity of the spark plug or to a specific lower position. After warming-up the engine, however, it is intended to effect complete combustion and attain both engine emissions cleaning and improvement of output by homogeneous combustion superior in combustion efficiency. To this end, it is necessary that fuel is injected into the cylinder at the intake stroke to form a homogeneous air-fuel mixture. However, since in-cylinder pressure of the intake stroke is equal to the atmospheric pressure or lower than the atmospheric pressure, a penetration of the fuel spray injected in the intake stroke becomes long and the fuel spray is apt to adhere to the cylinder liner. Besides, the cylinder liner may become worn due to the dilution of oil. Further, smoke may occur in the cylinder due to the adhesion of fuel to the cylinder and piston, consequently deterioration of engine emissions and vaporization of fuel may occur, and may result in lowering of output of the engine.

For solving such a problem it is necessary that the penetration of a fuel spray injected from the nozzle hole directed to the spark plug should be made small. According to the above mentioned conventional prior art in which nozzle holes vary in radius of the curved surface of each nozzle hole's inlet portion, penetrations of fuel sprays from the nozzle holes can vary in penetration. However, the curved surface radius of the nozzle hole's inlet requires a high machining accuracy because the size of the nozzle hole is very small. Besides, the required amount of fuel and the actual amount thereof may be different from each other under the influence of a machining error and thus mass production is difficult. Another method is to vary in nozzle hole-diameter. However, the larger the nozzle hole-diameter, the more a particle diameter of the fuel spray may become large and the combustion performance may be lowered.

The present invention is to provide an injector capable of making the penetration of a fuel spray directed to a spark plug small without any special machining and capable of improving both combustion in a cold state and combustion after warm-up of the engine, as well as an in-cylinder gasoline injection type internal combustion engine using the injector and a method for controlling the engine.

SUMMARY OF THE INVENTION

In one aspect of the present invention, for achieving the above-mentioned object, nozzle holes of a multi-hole injector are formed around respective inclined axes each having an inclination relative to a movement direction's axis of a movable valve member such as a valve needle; one of the inclined axes has an inclination angle smaller than the inclination angle of any of the other inclined axes; and the injector is mounted to the engine in such a manner that a smallest inclination angle's axis-nozzle hole among the nozzle holes injects fuel toward a central area of a crown face of a piston in the engine.

In another aspect of the present invention, nozzle holes of a multi-hole injector are formed around respective inclined axes each having an inclination relative to a movement direction's axis of a movable valve member such as a valve needle; one of the inclined axes has an inclination angle larger than the inclination angle of any of the other inclined axes; and the injector is mounted to the engine in such a manner that a largest inclination angle's axis-nozzle hole among the nozzle holes injects fuel toward a spark plug mounted near the center of a cylinder head in the engine or toward the vicinity thereof.

According to one aspect of the present invention described above, in connection with the flow of fuel into each nozzle hole and a fuel inflow angle (inlet angle) which are determined by a nozzle hole axis, the fuel inflow angle of a nozzle hole directed toward the central area of the piston crown or the vicinity thereof can be set small to make an effective flow path area large. Thereby, it is eventually possible to suppress the amount of fuel in the nozzle hole directed to the spark plug, and also at the time of injection in the intake stroke after warm-up, the spray of fuel does not adhere to the cylinder liner. Thus, the conventional problem could be solved.

According to another aspect of the present invention described above, in connection with the flow of fuel into each nozzle hole and a fuel inflow angle which is determined by a nozzle hole axis, the fuel inflow angle of a nozzle hole directed to the spark plug can be set large to make an effective flow path area of the nozzle orifice small. Thereby, it is possible to decrease the amount of fuel, and also at the time of injection in the intake stroke after warm-up, the spray of fuel does not adhere to the cylinder liner. Thus, the conventional problem could be solved.

DETAILED DESCRIPTION OF PREFERRED EMBODIMENTS

Figure 1:
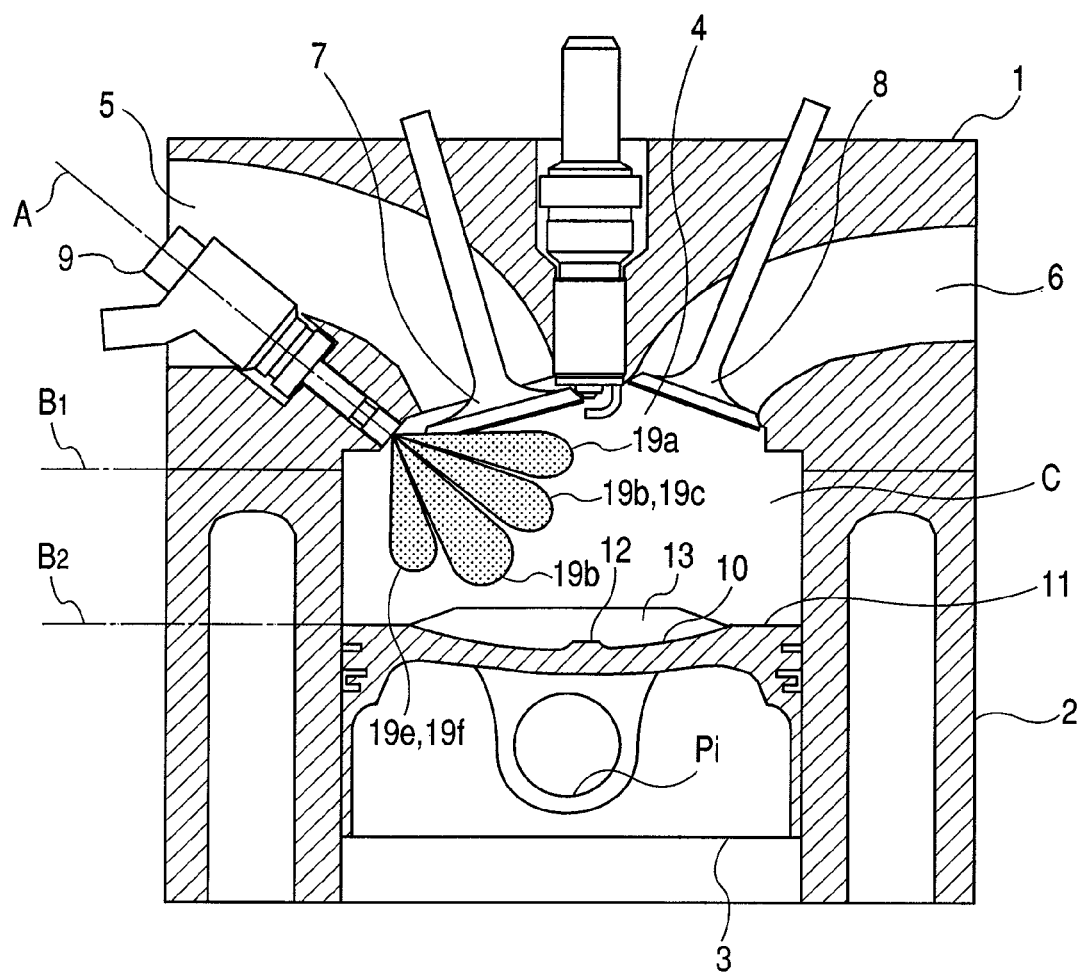
FIG. 1 illustrates a state just after fuel injection under a full throttle condition in the present invention.

The present invention will be described in detail hereinafter by way of embodiments thereof illustrated in the drawings.

First Embodiment

FIG. 1 illustrates the construction of an in-cylinder injection type engine according to an embodiment of the present invention.

A combustion chamber C is formed by a cylinder head 1, a cylinder block 2 and a crown face of a piston 3 which is slidably provided within the cylinder block 2. The cylinder head 1A is provided with a spark plug 4 at a central upper position of the combustion chamber C.

An intake pipe 5 and an exhaust pipe 6 are connected to the combustion chamber C, an intake valve 7 is provided for an inlet port of the combustion chamber C and an exhaust valve 8 is provided for an outlet port of the combustion chamber C.

An injector 9 for direct injection of fuel into the combustion chamber C is disposed on an intake side of the combustion chamber C. The injector 9 is installed in the cylinder head 1 in such a manner that the angle between an axis A of the injection 9 and a horizontal surface B1 of the cylinder 2 (a horizontal surface B2 of the crown face of the piston 3) is 40°.

Figure 2:
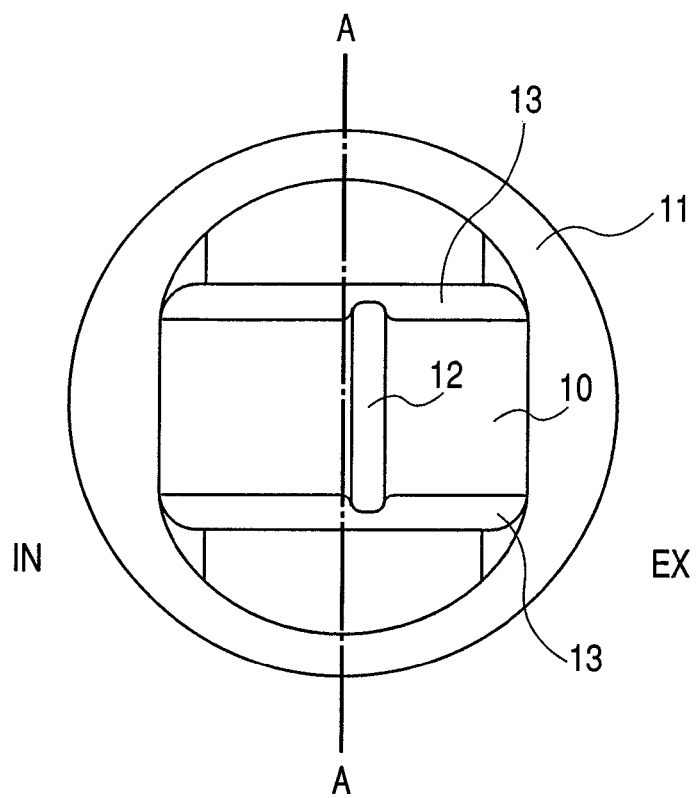
FIG. 2 illustrates an upper surface shape of a piston in the present invention.
Figure 3:
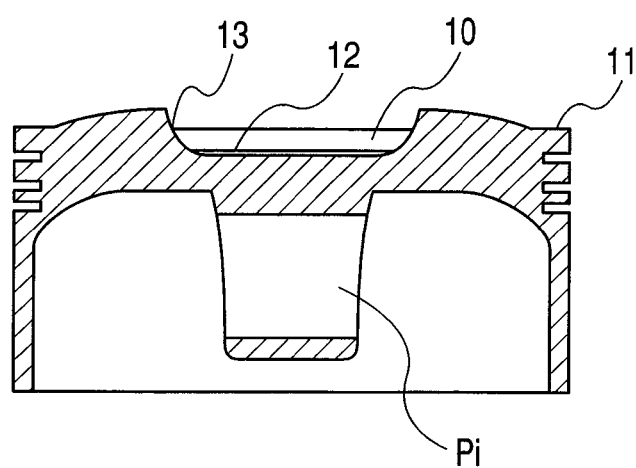
FIG. 3 illustrates a piston shape in a section taken on line A-A in FIG. 2.

The shape of the piston 3 as seen from above is shown in FIG. 2 and a section taken on line A-A in FIG. 2 is shown in FIG. 3. The crown face of the piston 3 is provided with a cavity 10 which is extending from the intake valve side 1N toward the exhaust valve side EX so as to be deepest centrally. The cavity 10 has a rectangular outer periphery shape and a bottom of an arc-curved shape in cross-section. Both opposite sides 13 of the cavity 10 are formed as walls higher than a horizontal surface of the piston 3. In the direction of the section A-A the bottom of the cavity 10 is a flat surface, while in a direction orthogonal to the section A-A the bottom of the cavity is in an arcuate shape which becomes shallower gradually toward the intake valve side and exhaust valve side as in FIG. 1. A slight straight-elongated prominence portion 12 as shown in FIGS. 2 and 3 is formed in the cavity 10 so as to extend across a position under the spark plug 4. The prominence portion 12 is connected as a smooth curved surface to the bottom of the cavity 10. The height of the prominence portion 12 is set at 2 mm from the bottom of the cavity 10. As shown in FIG. 3, the side walls 13 of the cavity are curved toward the outside and are connected to both crown face of the piston 3 and bottom of the cavity 10. No other stepped portion than the prominence portion 12 is formed within the cavity 10. The side walls 13 of the cavity 10 are formed about 5 mm from the cavity bottom.

Figure 4:
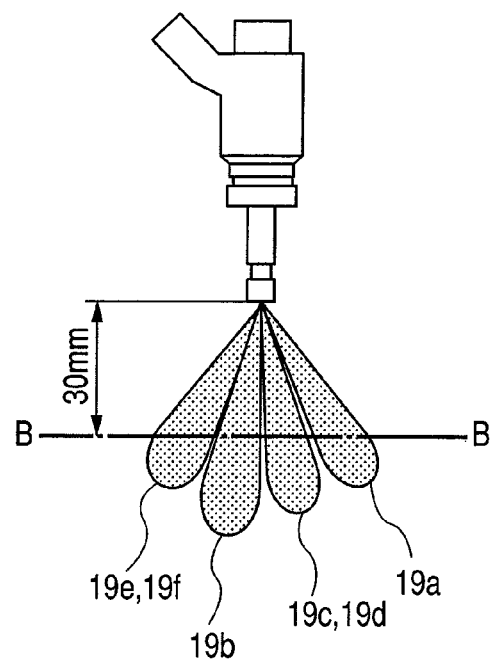
FIG. 4 illustrates an appearance shape of spray in the present invention.
Figure 5:
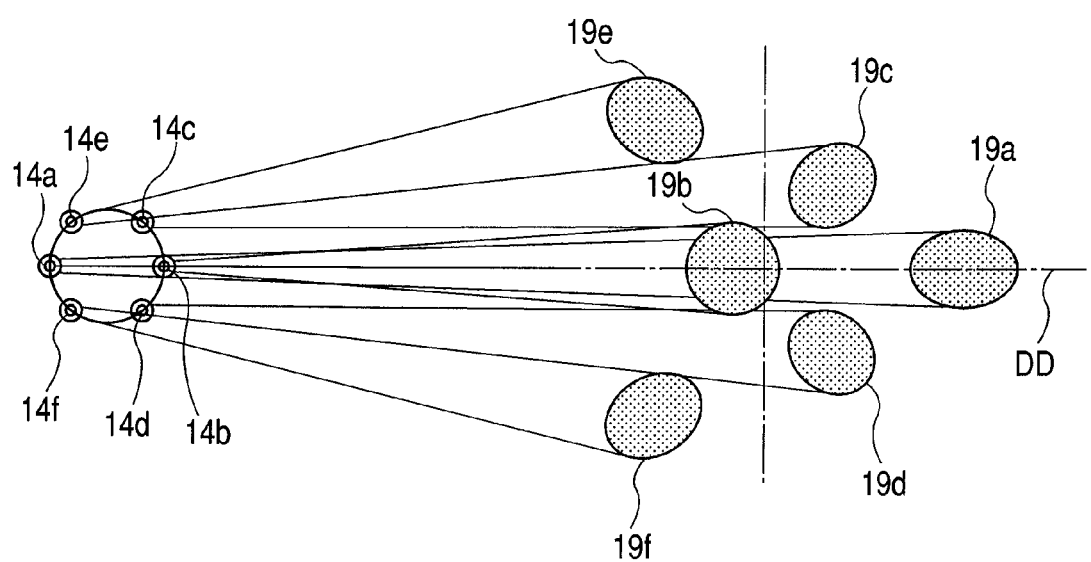
FIG. 5 illustrates a spray shape in a section taken on line B-B in FIG. 4.

Shapes of fuel sprays from the injector 9 are shown in FIGS. 4 and 5. FIG. 4 shows an appearance shape of the sprays when observed under the conditions of a fuel pressure of 11 MPa and an ambient pressure being the atmospheric pressure. FIG. 5 shows sectional shapes of the sprays upon lapse of 1 ms after fuel injection at a plane orthogonal to the axis of the injector 9 at a position of 30 mm from the tip of the injector.

Figure 6:
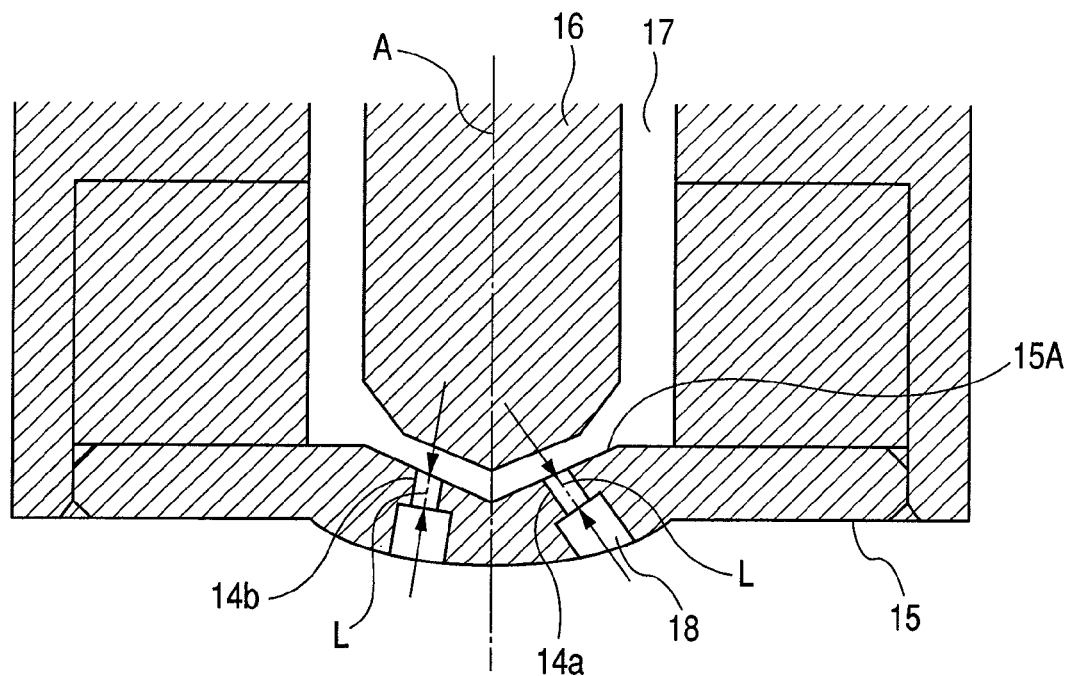
FIG. 6 illustrates a section of a nozzle tip in the present invention.

A sectional shape of the tip of the injection 9 is shown in FIG. 6. A plate (nozzle plate) 15 having nozzle holes 14a to 14f is provided at the tip of the injector 9. Since FIG. 6 is a sectional view taken along center line VI-VI in FIG. 7, only the nozzle holes 14a and 14b can be seen in the same figure. A needle valve 16 as a movable element is disposed centrally in a nozzle body and a fuel flow path 17 is formed around the needle valve. Fuel is supplied from above in the figure.

When a magnetic coil (not shown) for the injector is turned off, the needle valve 16 is pressed against a seat portion (valve seat) 15A formed on the plate 15 with a force of a return spring (not shown) installed within the injector 9, so that the fuel sealed by the needle valve 16 is never injected. When the magnetic coil is turned on, the needle valve 16 is moved up in a direction of needle valve-axis, so that the fuel flows from the fuel flow path 17 into the nozzle holes 14a-14e, then passes through a counterbore-like portion 18 (which is formed at the tip side of each nozzle hole and larger than each nozzle hole in hole-diameter: namely large-diameter portion) and is injected. Given that the nozzle hole length is L (the length of each of the nozzle holes (a small-diameter portion) 14a-14e and the nozzle hole diameter is D (the diameter of the small-diameter portion of each of the nozzle holes 14a-14e; see FIG. 9), the length of the counterbore-like portion 18 is determined so as to give an L/D ratio of 1.5.

Figure 7:
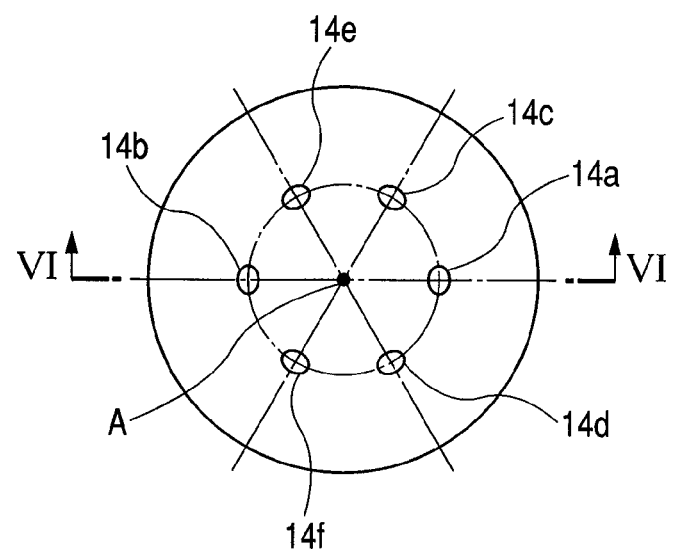
FIG. 7 illustrates the shape of a plate as seen from an injector side in the present invention.

FIG. 7 shows the shape of the plate 15 as seen from the needle valve 16 side. The nozzle holes 14a-14f are arranged concentrically around the axis A of the injector 9. The nozzle holes are formed so as to be equally spaced and have the same diameter (D), but face in different directions (inclined axes). As shown in FIG. 5, the directions (inclined axes) of the nozzle holes are determined so that the fuel injected from the nozzle hole 14a forms a spray 19a, the fuel from the nozzle hole 14b forms a spray 19b, the fuel from the nozzle hole 14c forms a spray 19c, the fuel from the nozzle hole 14d forms a spray 19d, the fuel from the nozzle hole 14e forms a spray 19e and the fuel from the nozzle hole 14f forms a spray 19f.

Figure 8:
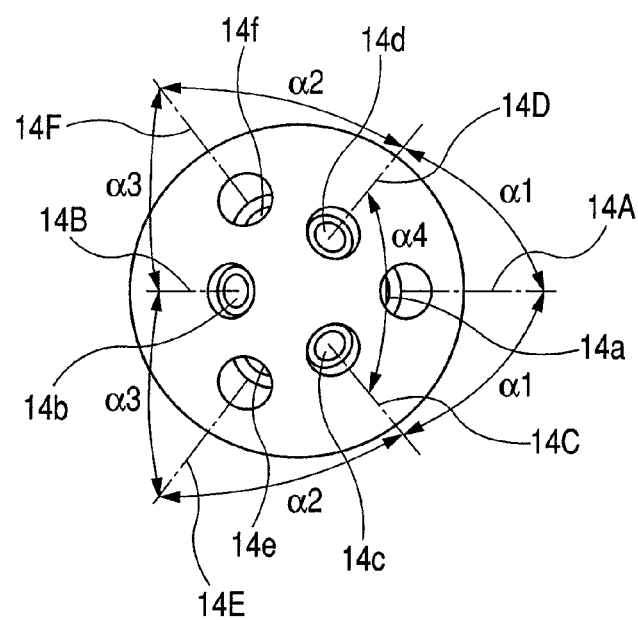
FIG. 8 illustrates the shape of the plate as seen from the outside of the injector in the present invention.

FIG. 8 shows the shape of the plate 15 as seen from below the injector 9. Inlets of nozzle holes 14 are arranged at equal intervals on the same circumference, but since the directions of the nozzle holes are different from each other, the counterbore-like portions located on a downstream side (outlet side) of the nozzle holes are not present on the same circumference and are spaced at non-uniform intervals. The nozzle holes are symmetrically disposed with respect to the line DD between nozzle holes 14a and 14b in FIG. 5. In the case where the spacing between adjacent injected sprays is narrow, the spray shape and direction vary due to interference between the sprays. Therefore, the angle a1 between inclined axes 14A and 14C (also 14A and 14D) of the nozzle holes 14a and 14c (14a and 14d), the angle a2 between inclined axes 14C and 14E (also 14D and 14F) of the nozzle holes 14c and 14e (14d and 14f), the angle a3 between inclined axes 14E and 14B (also 14F and 14B) of the nozzle holes 14e and 14b (14f and 14b), and the angle a4 between inclined axes 14C and 14D of the nozzle holes 14c and 14d, are each set at 20° or more.

Figure 9:
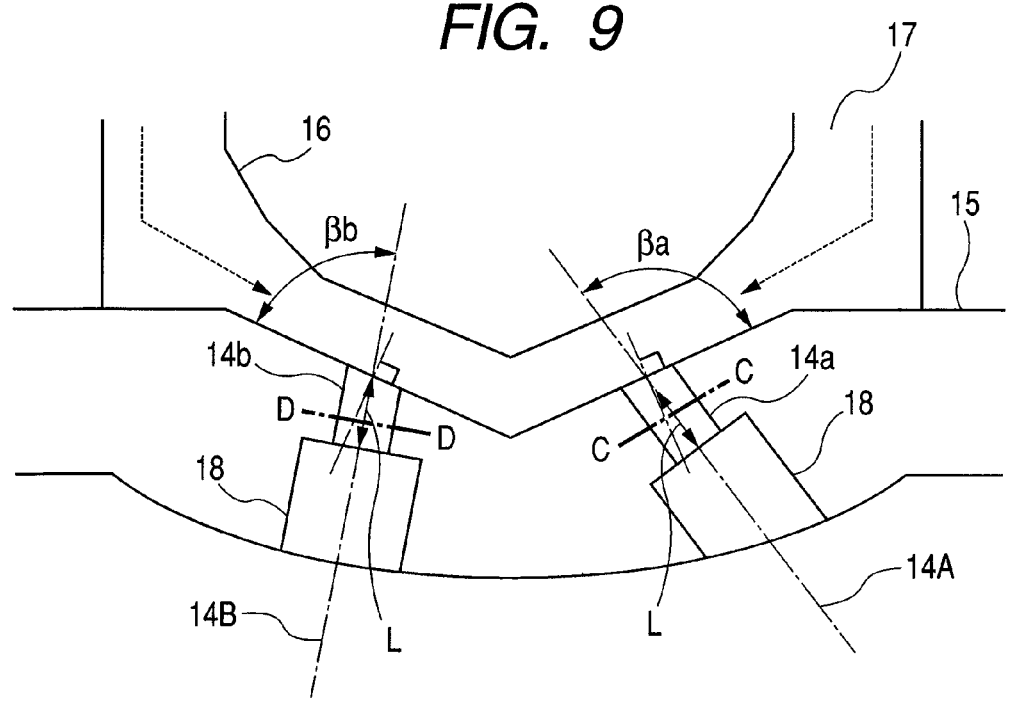
FIG. 9 illustrates a relation between nozzle holes and the plate in the present invention.
Figure 10:
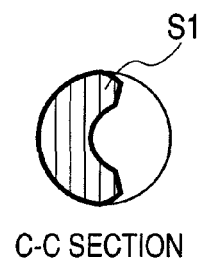
FIG. 10 illustrates a state of a fuel flow path in a section taken on line C-C in FIG. 9.
Figure 11:
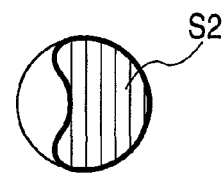
FIG. 11 illustrates a state of a fuel flow path in a section taken on line D-D in FIG. 9.

FIG. 9 shows an enlarged tip of the needle valve 16. A cross section of the nozzle hole 14a is shown in FIG. 10 and that of the nozzle hole 14b is shown in FIG. 11. When the injector is opened, fuel flows through the fuel flow path 17, passes through a gap formed between the needle valve 16 and the tapered surface including the seat portion 15A of the plate 15 and flows into the nozzle holes 14.

Figure 12:
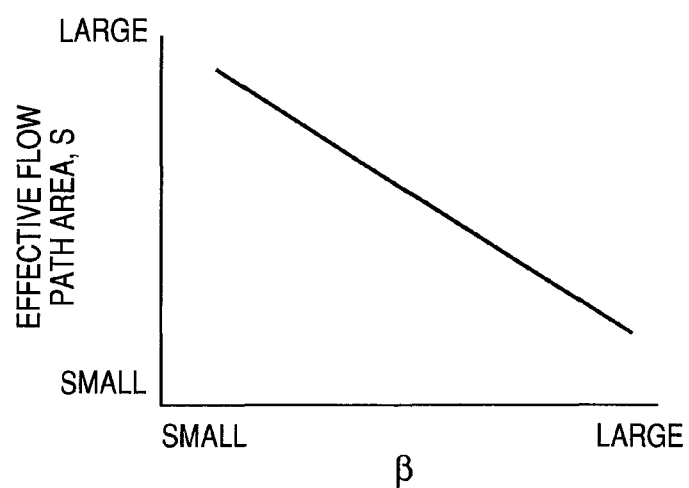
FIG. 12 illustrates a relation between a plate-nozzle hole angle β and an effective flow path area S.
Figure 13:
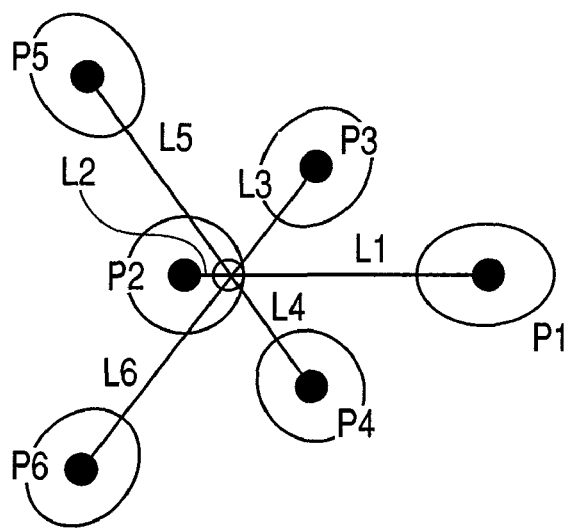
FIG. 13 illustrates a relation of distances L from centers P of sprays to the center of the injector.
Figure 14:
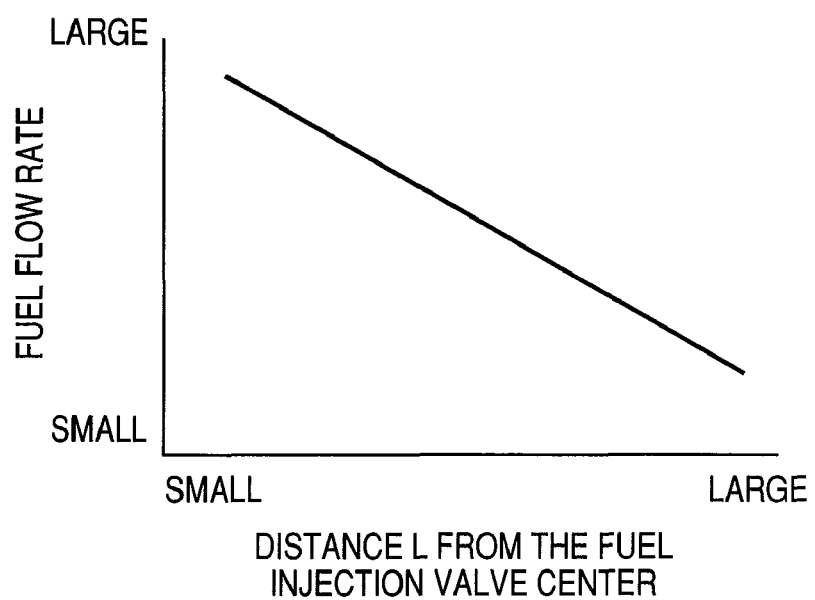
FIG. 14 illustrates a relation between the distance L from the injector center and the amount of fuel.

Given that a tapered surface including the seat portion 15A of the plate 15 is defined as an upstream-side tapered surface with respect to the nozzle orifice and an angle between the upstream-side tapered surface as a fuel inflow side of the plate 15 and the axis of each nozzle hole is B, nozzle holes are provided inclinedly so that the inclined angle βa of the axis of the nozzle hole 14a is larger the angle βb of the inclined axis of the nozzle hole 14b. Consequently, a fuel drift within the nozzle hole 14a, which occurs when the fuel flows into the nozzle hole 14a, becomes larger than a fuel drift with the nozzle hole 14b, which occurs when the fuel flows into the nozzle hole 14b. When a fuel passing area through each nozzle hole 14 is defined as an effective flow path area S, an effective flow path area S1 (FIG. 10) of the nozzle hole 14a is smaller than an effective flow path area S2 (FIG. 11) of the nozzle hole 14b and the amount of the spray 19a from the nozzle hole 14a becomes smaller than that of the spray 19b from the nozzle hole 14b. The angle β and the effective flow path area S are in such a relation as shown in FIG. 12. As shown in the same figure, the larger the angle β, the smaller the effective flow path area S. The rates of fuel sprays from nozzle holes can be changed by changing the angle β. The angle β becomes larger in the order of nozzle hole 14b (smallest among the nozzle holes), nozzle holes 14c and 14d, then nozzle holes 14e and 14f, and nozzle holes 14a (largest among the nozzle holes). As to the amounts of fuel sprays, they are in the order of sprays 19b (largest among the fuel sprays), 19c, 19d, then sprays 19e, 19f, and spray 19a (smallest among the fuel sprays). Given that the distance from the axis of the injector 9 to a spray center axis P is L as shown in FIG. 13, the sprays and their amounts are in such a relation as shown in FIG. 14. That is, the smaller the distance L, the larger the amount of spray. Thus, the nozzle holes are designed so that the rate of the spray 19b is the largest and 20% to 25% of the amount of fuel to be injected is supplied from this nozzle hole, while the remaining 75% to 80% fuel is supplied sharingly in the range of 10% to 20% from each of the remaining five nozzle holes.

The injector 9 is installed so that the spray 19a directs toward the spark plug 4, and the nozzle holes 14a and 14b are positioned on a center-line vertical section plane of the cylinder.

Figure 19:
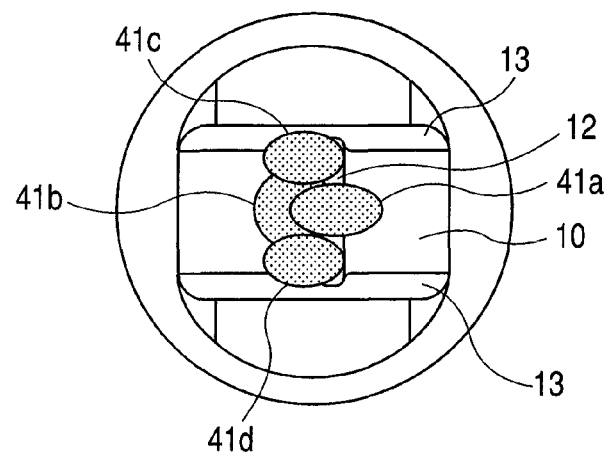
FIG. 19 illustrates a state of an air-fuel mixture as seen from the upper surface of the piston at 30° of the crank angle after the top dead center in the present invention.

A state of the fuel sprays during injection at the intake stroke will be described below while making FIGS. 19, 20 and 21 correspondent to FIG. 5.

The spray 19a from the nozzle hole 14a reaches an area immediately below the spark plug 4 and then forms an air-fuel mixture 42a. The spray 19b from the nozzle hole 14b reaches the center of the piston crown face, then the direction thereof is changed toward the spark plug by the prominence portion 12 and forms an air-fuel mixture 42b below the spark plug.

The sprays 19c and 19d from the nozzle holes 14c and 14d reach opposite sides of the piston crown face on the exhaust valve side and form air-fuel mixtures 42c and 42d.

The sprays 19e and 19f from the nozzle holes 14e and 14f reach opposite sides of the piston crown face on the intake valve side and form air-fuel mixtures 42e and 42f.

Thus, air-fuel mixtures can be formed in a widely spread state throughout the whole of the combustion chamber, so that the air-fuel mixtures within the cylinder become homogeneous and it is possible to obtain a mixture distribution suitable for homogeneous operation.

In the case where fuel is injection in the latter half of the compression stroke or in the first half of the expansion stroke, the state of spray varies. In this case, air-fuel mixtures concentrate near the position under the spark plug on the central area of the piston crown, as shown in FIG. 19. As a result, it is possible to obtain a mixture distribution suitable for stratified operation.

A description will now be given about a method for conforming such fuel spray shapes as shown in FIG. 5. As to fuel to be injected it is desirable to use gasoline which is actually injected within the engine, but there may be used fluid having the same properties as gasoline. The pressure of the fuel is pressurized to 11 MPa and the thus-pressurized fuel is injected into a vessel having an ambient pressure equal to the atmospheric pressure. It is necessary that a window permitting incidence of sheet light about 5 mm in thickness and a window permitting spray photographing with a high-sensitivity camera be formed in the vessel. An injection pulse from the start of fuel injection up to end thereof is set at 1 ms and a driving pulse signal is applied to the injector to inject fuel. In synchronism with the driving pulse signal a spray photograph may be taken in 1 ms after the injection. Any light source may be used insofar as the spray shape can be seen. It is desirable that the spray be seen not from a one-shot image but from an average image of several ten to several hundred times of shots.

Figure 15:
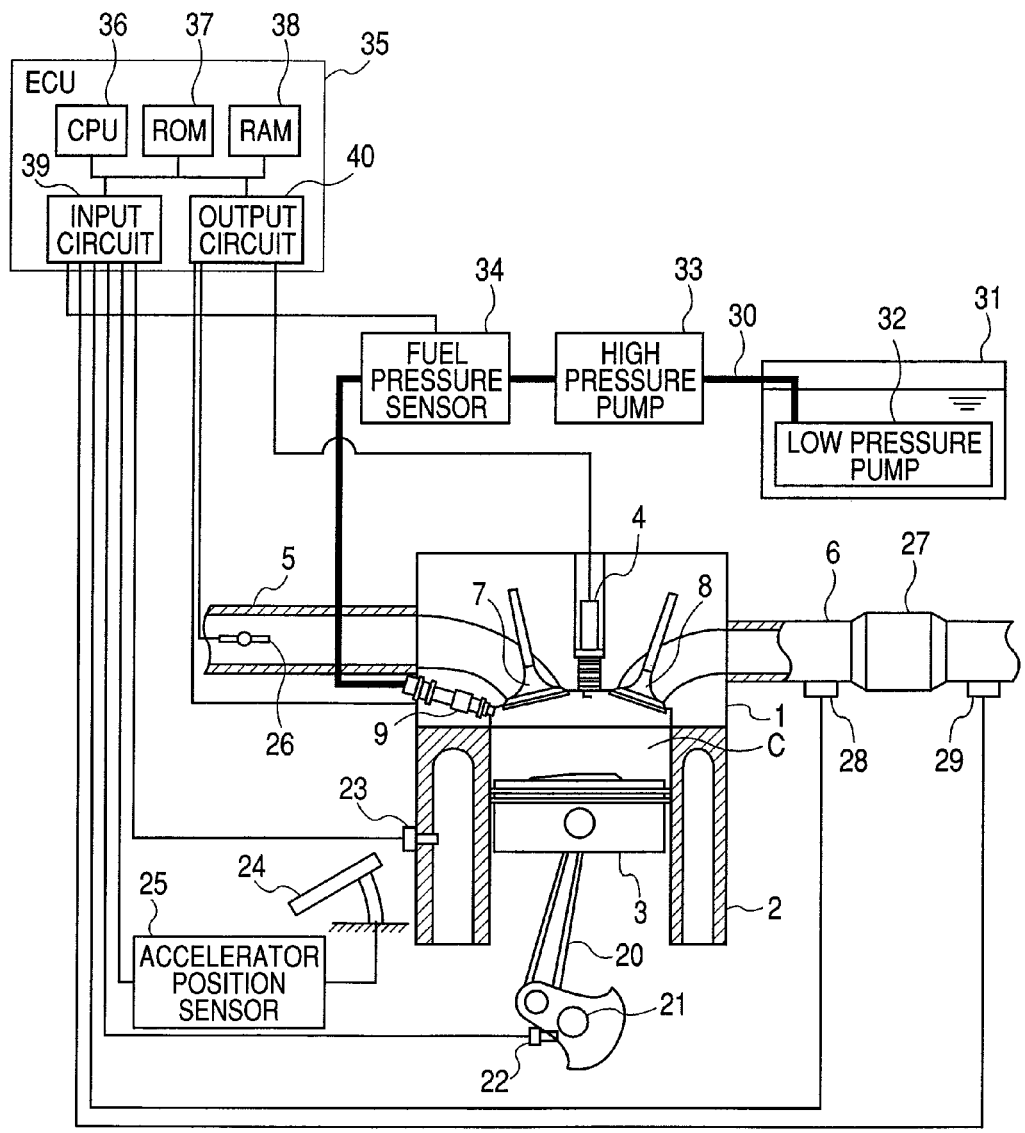
FIG. 15 illustrates the construction of an engine in the present invention.

FIG. 15 shows the entire engine schematically. The piston 3 is connected to a crank shaft 21 through a connecting rod 20 and a crank angle sensor 22 capable of sensing both crank angle and engine speed is installed to the crank shaft 21. A water temperature sensor 23 for sensing the temperature of cooling water is installed to the cylinder block 2. An accelerator position sensor 25 for sensing the depression of an accelerator by a driver is provided in an accelerator pedal 24. A throttle valve 26 capable of controlling the amount of intake air is installed in the intake pipe 5 and an air flow sensor (not shown) capable of sensing the flow rate of intake air is installed upstream of the throttle valve 26. A three-way catalytic converter 27 is installed in the exhaust pipe 6 and an air-fuel ratio sensor 28 and an $O_2$ sensor are installed upstream and downstream, respectively, of the three-way catalytic converter 27. A low pressure pump 32 installed within a fuel tank 31 is connected to the injector 9 through a fuel pipe 30 for high fuel pressure. A high pressure pump 33 for further raising the pressure of fuel and a fuel pressure sensor 34 capable of sensing the fuel pressure are installed in middle positions of the fuel pipe 30.

An electronic control unit (ECU) 35 is comprised of a central processing unit (CPU) 36 which performs arithmetic processing in accordance with set programs, a read-only memory (ROM) 37 which stores control programs and data necessary for arithmetic operations, a random access memory (RAM) 38 for storing the results of arithmetic operations temporarily, an input circuit 39 adapted to receive signals from various sensors, and an output circuit 40 which transmits signals to various devices in accordance with the results of arithmetic operations.

Next, the operation of this first embodiment will be described with reference to FIGS. 15 to 18. When the engine is keyed ON, a signal provided from the water temperature sensor 23 is sent to the CPU 36 via the input circuit 39 in accordance with a program stored in the ROM 37. When the water temperature is not lower than 80° C., it is determined that warm-up has already been finished, and the engine is started by a general condition stored in the ROM 37.

When the water temperature is lower than 80° C., a cold starting mode is set and fuel is injected in accordance with a pulse width pre-stored in the ROM 37. Since the fuel vaporizing performance is lowered when the water temperature is in low. Therefore, map data such that the lower the water temperature, the larger the amount of fuel injected, are stored in the ROM 37. Injection timing and ignition timing are also set to respective numerical values stored in the ROM 37 and starting is made by a starter.

A signal provided from the crank angle sensor 22 is sent to the CPU 36 via the input circuit 39. When the number of engine speed is less than 1000 r/min, it is determined that a cranking condition exists, and operation is carried out in accordance with the pulse width, injection timing and ignition timing stored in the ROM 37 as described above.

When the number of engine speed becomes 1000 r/min or more at the time of starting, it is determined that a fast idle condition exists. In the fast idle condition, since the exhaust gas temperature is made high, it is possible to effect stable combustion and the ignition timing is set to the most retardable timing. In this embodiment the ignition timing is set at 30° after the top dead center. The number of times of fuel injection is set to twice. The first injection timing is set at 30° before the top dead center and the second injection timing is set at 28° after the top dead center. These conditions are determined within the range of stable combustion. Fuel injection quantities are stored beforehand in the ROM 37 in such a manner that IMEP (illustrated mean effective pressure) becomes 150 kPa at the aforesaid injection timing and ignition timing. Further, fuel injection quantities are determined so that the ratio of the first to the second fuel injection quantity becomes 6:4. The degree of opening of the throttle valve 26 is controlled so as to give an air-fuel ratio of 16 relative to the fuel injection quantity concerned.

Since the ignition timing is delayed in the first idling, the combustion efficiency is in low level, a large fuel injection quantity is needed for making IMEP 150 kPa and the throttle valve 26 eventually assumes a nearly full throttle state for obtaining an air-fuel ratio of 16. A signal provided from the fuel pressure sensor 34 is sent to the RAM 38 via the input device 39. Map data capable of determining injection pulse widths from fuel pressures and fuel injection quantities are stored beforehand in the ROM 37 and first and second pulse widths are determined in accordance with the map data.

Figure 16:
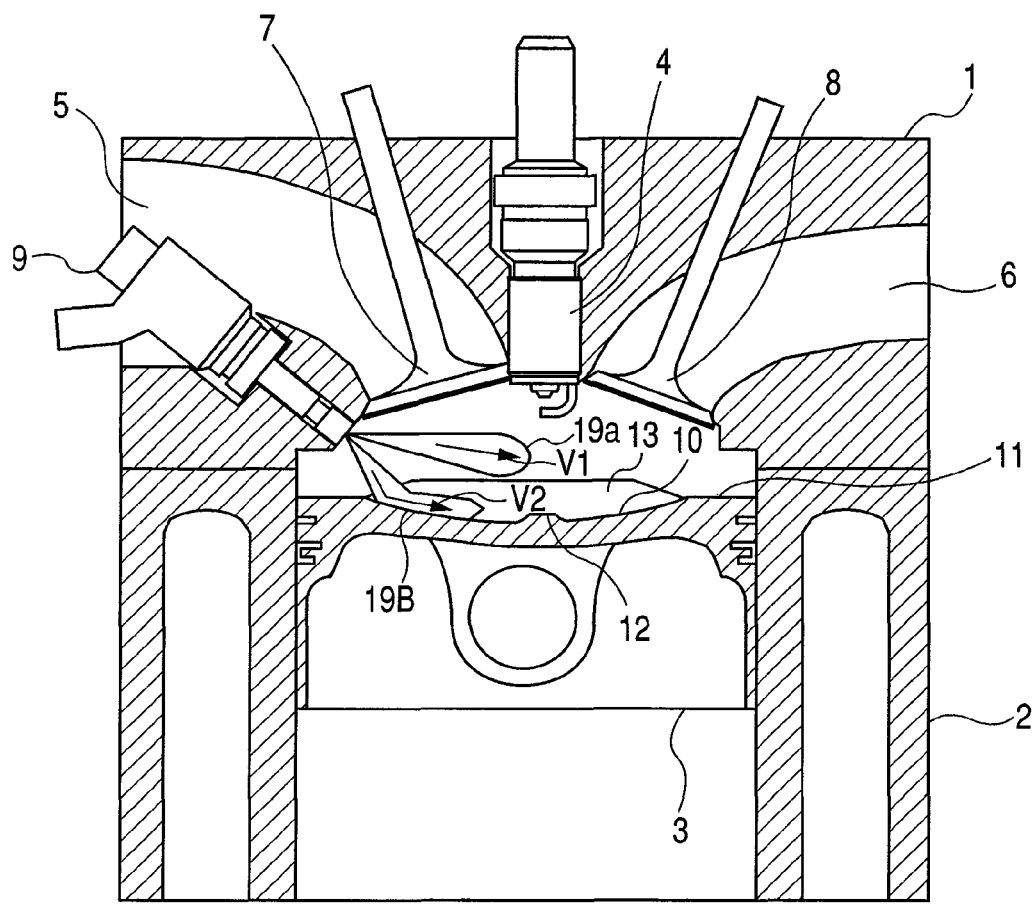
FIG. 16 illustrates a state at 10° of a crank angle after fuel injection under a cold condition in the present invention.

In the fast idle state and under the condition of an engine speed of 1400 r/min, FIG. 16 shows in what state the interior of the combustion chamber is when about 10° has elapsed after the first fuel injection. All of FIGS. 16 to 18 show in what state the combustion chamber is at its central section.

The nozzle hole 14a is directed toward a somewhat lower position with respect to the spark plug 4 when the injector 9 is mounted to the engine, so that the spray 19a advances downwards of the spark plug 4. On the other hand, the nozzle hole 14b is directed toward the piston 3, so that the spray 19b strikes against the piston 3. At this time, the spray 19b is guided to the exhaust side along a slope of the cavity 10 of the piston 3. At this time, friction between the fuel spray and the air occurs and the spray 19a forms an air flow V1 advancing from the intake side to the exhaust side, while the spray 19b forms an air flow V2 advancing to the exhaust side on the surface of the piston 3.

Figure 17:
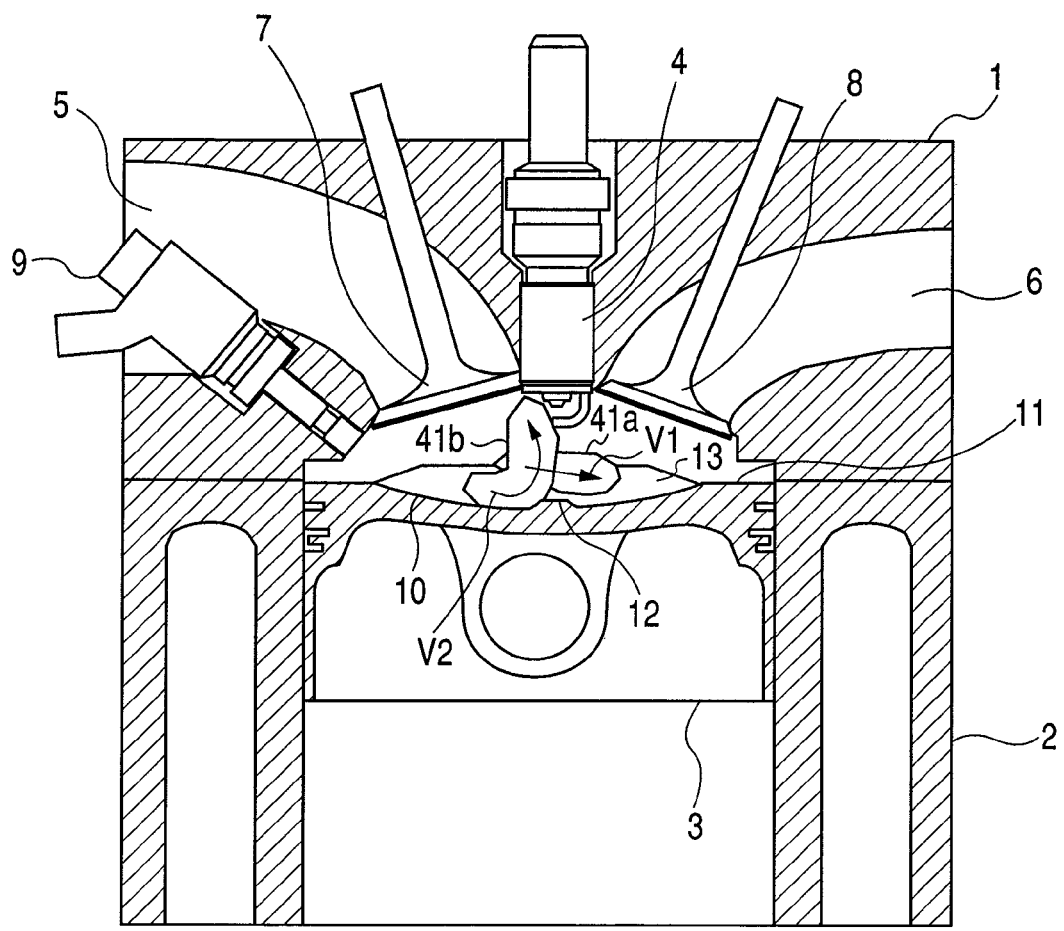
FIG. 17 illustrates a state of a top dead center under a cold condition in the present invention.
Figure 18:
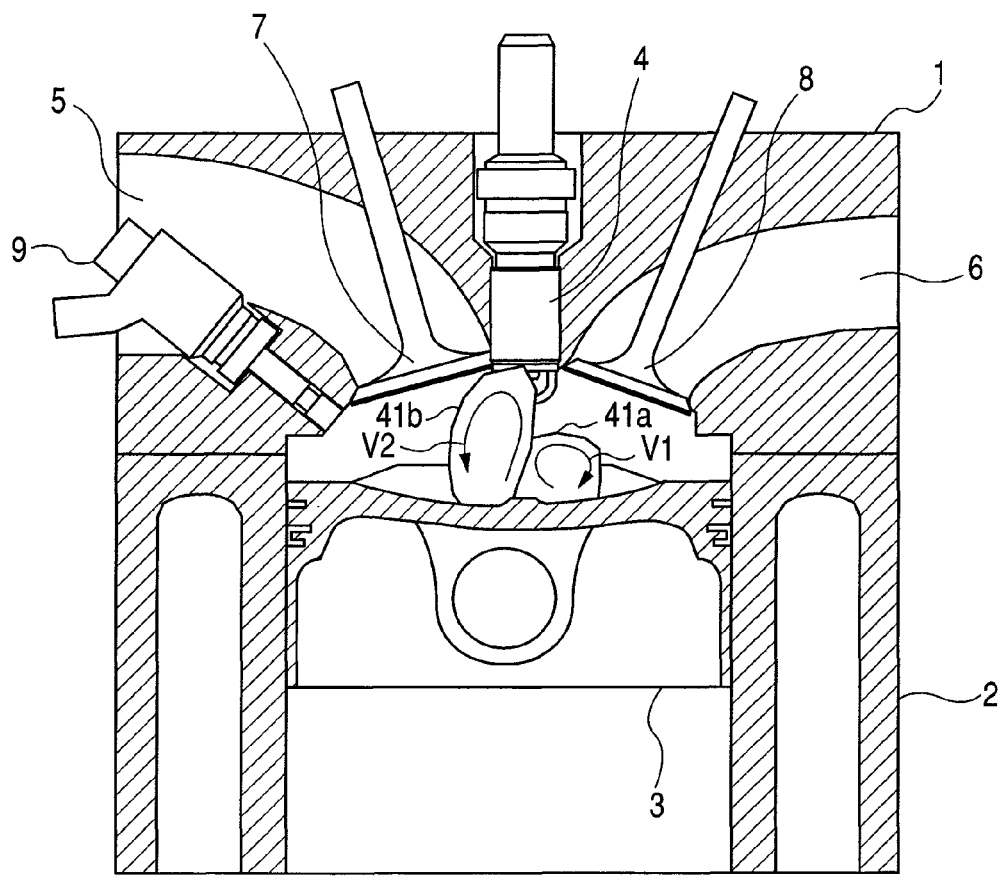
FIG. 18 illustrates a state at 30° of the crank angle after the top dead center under a cold condition in the present invention.

FIG. 17 shows in what state the air-fuel mixture present within the combustion chamber is at the top dead center. After the injection of fuel, the piston performs a compressing operation in the compression stroke, so that the air temperature in the cylinder is high and fuel is apt to vaporize. The spray 19a forms an air-fuel mixture 41a while passing below the spark plug 4. The spray 19b advances while sliding on the surface of the cavity 10 of the piston 3 and forming an air-fuel mixture 41b. The air-fuel mixture 41a vaporized from the spray 19a is present below the spark plug 4, while the air-fuel mixture 41b vaporized from the spray 19b is present on the surface of the piston 3. Since the spray 19b is in collision with the piston 3, the air flow V2 is weaker than the air flow V1. At this time, the pressure around the air flow V1 is lower than the pressure around the air flow V2 and it is possible to occur a phenomenon of the air-fuel mixture 41b being pulled up by the air flow V1.

FIG. 17 shows in what state the air-fuel mixture is at 30° after the top dead center which corresponds to the ignition timing.

The air flow V2 moves along the surface of the cavity 10 of the piston 3, but is changed to a rising flow by the prominence portion 12 formed centrally of the piston 3 and becomes a tumbling flow below the spark plug 4. Consequently, the air-fuel mixture 41b gets on the air flow V2 and stays around the spark plug 4. As to the air flow V1, it is influenced by the tumbling flow of the air flow V2 and becomes a tumbling flow in the direction opposite to the tumbling flow direction of the air flow V2. The air-fuel mixture 41a gets on the air flow V1 and stays on the right side in the figure of the spark plug 4, i.e., on the exhaust valve side.

Figure 23:
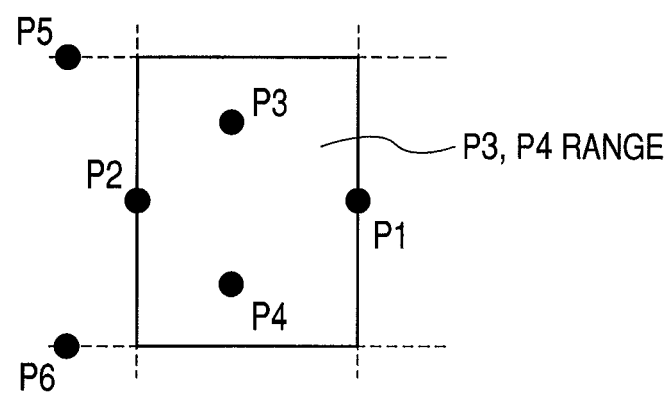
FIG. 23 illustrates a range aimed at by sprays 19c and 19d in the present invention.

For improving the combustion stability in the retard combustion operation it is necessary that the air-fuel mixtures be concentrated on the spark plug 4. As shown in FIG. 23 it is desirable to set the directions of sprays 19c and 19d in such a manner that P3 and P4 lie within the range of P1 and P2 and also within the range of P5 and P6.

By so doing, after the injection of fuel, the sprays 19c, 19d and the sprays 19e, 19f strike against the insides of the side walls 13 of cavity on the piston 3 and an air-fuel mixture 41c vaporized from the spray 19c and an air-fuel mixture 41d vaporized from the spray 19d, like the air-fuel mixture 41b, are pulled up by an air flow A advancing from the piston 3 toward the plug. At this time, air-fuel mixtures 41e and 41f vaporized from the sprays 19e and 19f are also pulled up by the air flow advancing from the piston 3 toward the plug. Since the air-fuel mixtures 41c, 41d, 41e and 41f are restrained with the side walls 13 of the cavity 10 on the piston 3 as shown in FIG. 19, they do not spread to opposite sides of the cavity and thus the air-fuel mixtures can be concentrated around the spark plug 4 in a distributed state around the air-fuel mixtures 41a and 41b.

By thus collecting air-fuel mixtures in the vicinity of the spark plug 4 it becomes possible to effect stable combustion even at a retarded ignition timing like 30° after the top dead center. Further, since the height of the prominence 12 is as small as 2 mm, there is no possibility of air-fuel mixtures being concentrated to excess on the prominence portion 12 and it is possible to suppress the generation of smoke from the surface of the cavity 10 of the piston 3.

Next, the operation in the full throttle operation mode of the engine in this embodiment will be described with reference to FIGS. 1, 20 and 21. When the accelerator pedal 24 is depressed after warm-up, a signal provided from the accelerator position sensor 25 is sent to the CPU 36 via the input circuit 39 and the degree of opening of the accelerator pedal is sensed. Likewise, a signal provided from the crank angle sensor 23 is sent to the RAM 38 and the number of revolutions is calculated by the CPU 36. From the engine speed-load map data provided beforehand in the ROM 37 for both accelerator position and engine speed, the CPU 36 determines the degree of opening of the throttle valve 26. Then, a control signal is provided from the output circuit 40 to actuator-drive circuit for the throttle valve 26 to control the same valve to a target degree of opening.

The amount of fuel to be injected is set to a value of approximately 11 to 14 in terms of an air-fuel ratio. The fuel injection timing is determined on the basis of accelerator position-engine speed map data provided beforehand in the ROM 38. In this embodiment the timing in question is set at 60° after the top dead center in a full throttle condition of the engine speed of 2000 r/min. FIG. 1 shows the interior of the combustion chamber as seen sideways from the injector just after fuel injection. After fuel injection, the fuel mixes with air and forms a homogeneous air-fuel mixture.

Figure 20:
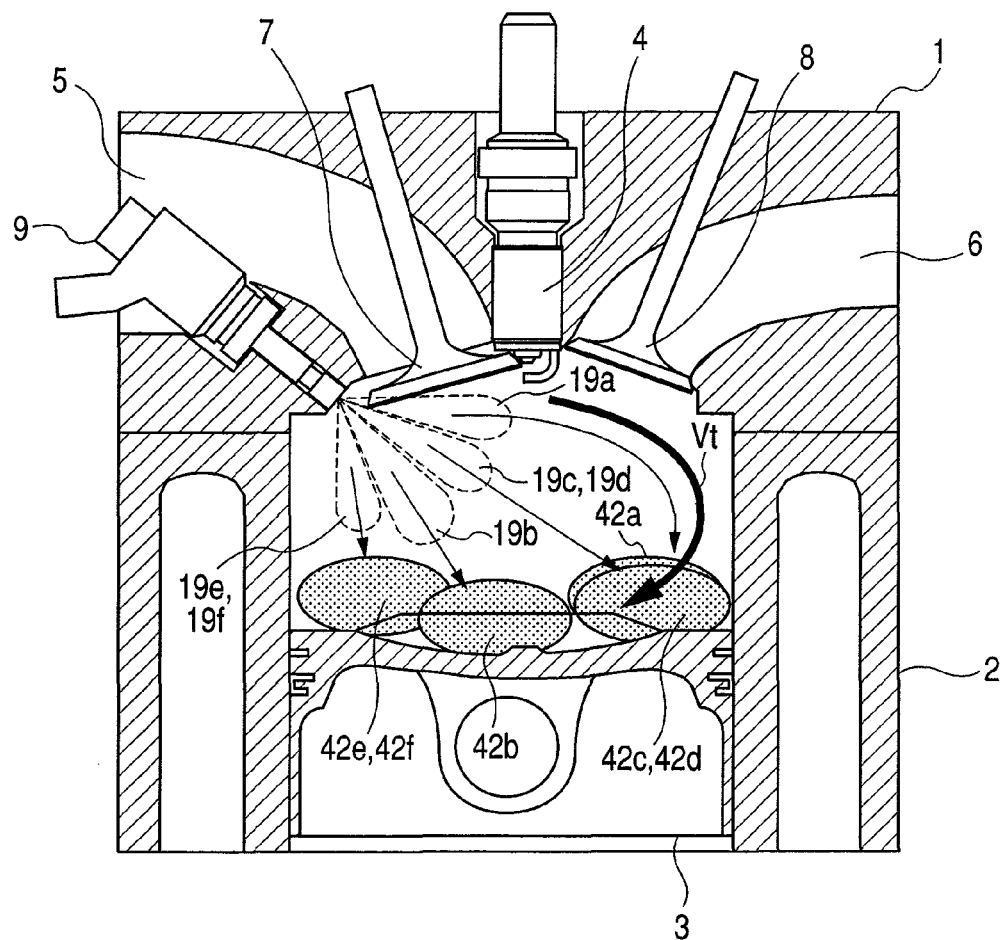
FIG. 20 illustrates a state at 20° of the crank angle after fuel injection under a full throttle condition in the present invention.
Figure 21:
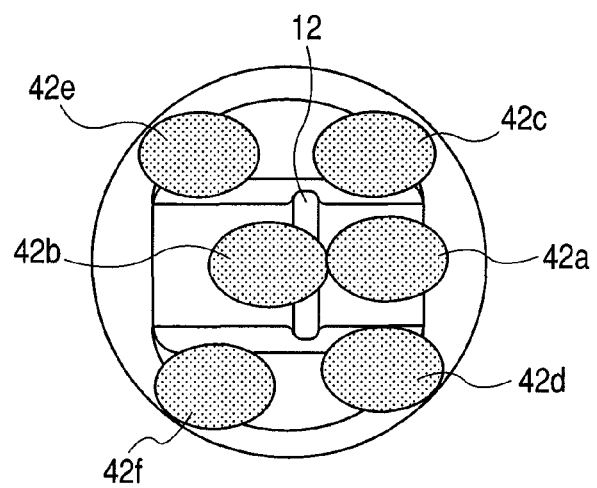
FIG. 21 illustrates a state of the air-fuel mixture as seen from the piston upper surface at 20° of the crank angle after fuel injection under a full throttle condition in the present invention.
Figure 22:
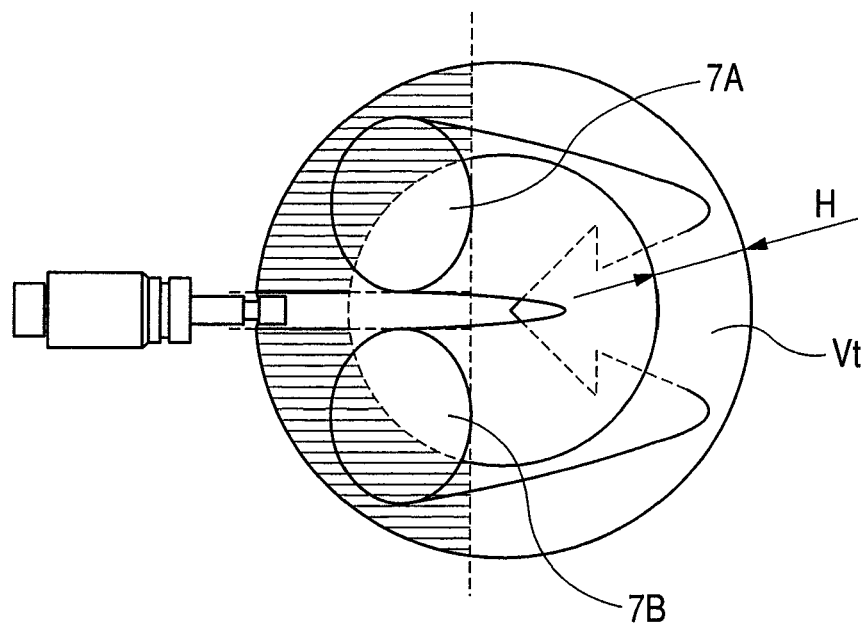
FIG. 22 illustrates a range aimed at by sprays 19e and 19f in the present invention.

FIG. 20 shows the interior of the cylinder at 20° after fuel injection. A tumbling flow Vt is forms with intake air in the cylinder. However, the amount of spray 19a is reduced relative to the sprays 19b and 19c and so the spray penetration of the spray 19a is weaker than that the other sprays. Therefore, there is no possibility of the fuel being carried by an air flow and adhering to the cylinder liner. Thus, there is no bad influence caused by oil dilution. Besides, each spray adheres to the piston surface centered on the cavity 10 of the piston 3 and is vaporized by the heat of the piston to form an air-fuel mixture between the piston crown face and the inner wall surface of the cylinder head. The air-fuel mixtures 42a-42f vaporized from the sprays 19a-19f are formed above the vicinity of the crown face of the piston 3, then are stirred by the tumbling flow Vt and are dispersed within the cylinder, forming homogeneous air-fuel mixtures. The height of the prominence portion 12 formed in the cavity 10 of the piston 3 is 2 mm, scarcely exerting any influence on the tumbling flow Vt. FIG. 21 shows the distribution of air-fuel mixtures observed when the piston 3 is seen from above. By spacing the sprays 200 from one another it is possible to make the air-fuel mixtures in the combustion chamber homogeneous and hence possible to form homogeneous air-fuel mixtures ideal for combustion. For attaining a high output in a full throttle condition, it is necessary to improve fuel vaporization in the intake stroke and utilize the vaporization cooling effect to improve the charging efficiency and enlarge the knock limit. In view of this point, as shown in FIG. 22, the directions of the sprays 19e and 19f are set so as to lie in the range (a netted range) on the injector mounted wall surface side rather than the outer periphery portions of two intake valves 7A and 7B at the piston position in 60 deg ATDC which is an injection timing and so as to lie in the range of 20% distance H relative to the bore diameter from the piston outer periphery. Within this range the spacing between the intake valves 7A, 7B and the cylinder liner is narrow, so that the speed of air flows admitted from the intake valves 7 is high and due to a shearing force with air it becomes possible to promote vaporization of the sprays 19e and 19f.

At this time, tumbling air flows into the cylinder from the double intake valves and join together on the confronting cylinder inner wall surface to form a tumbling air flow along the piston crown face, which flow returns to the injector injector-installed side. This tumbling air flow passes between the air-fuel mixtures 42c and 42d and becomes a flow confronting the air-fuel mixtures 42a and 42b, whereby it is possible to attain a uniform dispersion of air-fuel mixtures within the cylinder.

Figure 24:
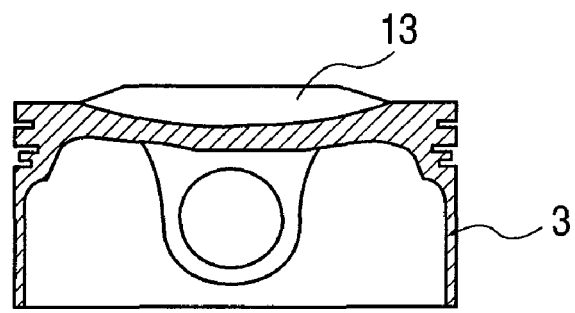
FIG. 24 illustrates a central section shape of a piston free of a prominence portion in the present invention.
Figure 25:
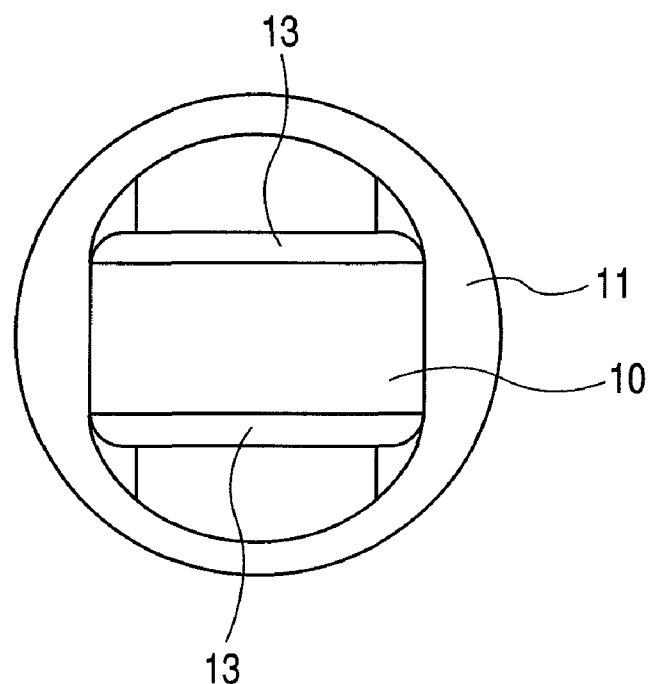
FIG. 25 illustrates the shape of the prominence-free piston as seen from an upper surface thereof in the present invention.

In this embodiment, there is used the piston 3 provided with the prominence portion 12 in the interior of the cavity 10, but in the case where the ignition timing may be 20° or so after the top dead center, there may be used a piston free of the prominence portion as shown in FIGS. 24 and 25. Also in this case it is possible to effect stable combustion.

In the piston described above in connection with this embodiment the cavity 10 is formed at position before and behind the prominence 12 by a cutting work while allowing the prominence portion 12 to remain on the piston crown face by machining under NC (numerical control). With this shape, not only the cavity formed in the piston crown is simple, but also it is positioned nearly uniformly before and behind the prominence portion 12 in a direction orthogonal to a piston pin insertion hole Pi, so that there is little strain caused by thermal deformation in both the direction along the piston cavity and the direction orthogonal to the cavity. Thus, no bad influence is exerted on the piston life.

As to other shapes of the cavity 10 formed in the piston crown face, a description will be given below with reference to FIGS. 26 to 37.

Figure 26:
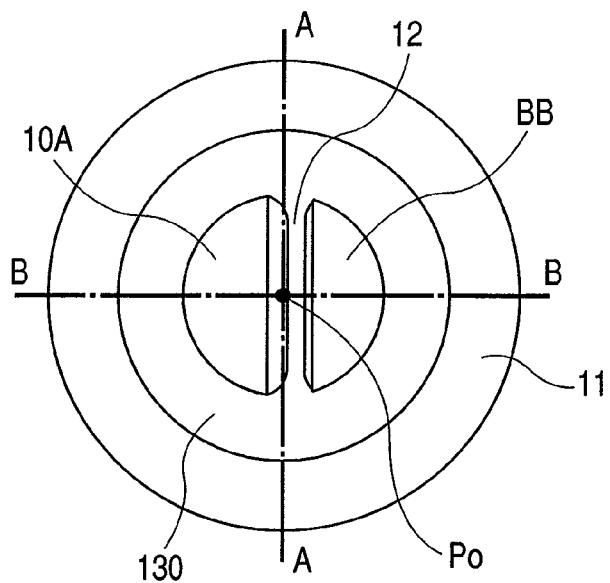
FIG. 26 is a top view showing a third example of a piston used in the present invention.
Figure 27:
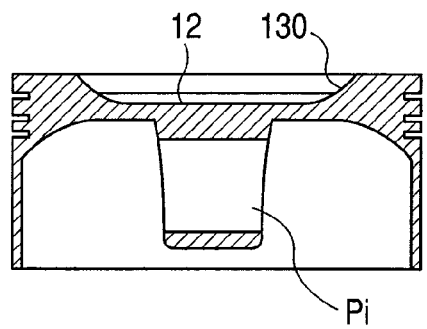
FIG. 27 is a sectional view taken on line A-A in FIG. 26.
Figure 28:
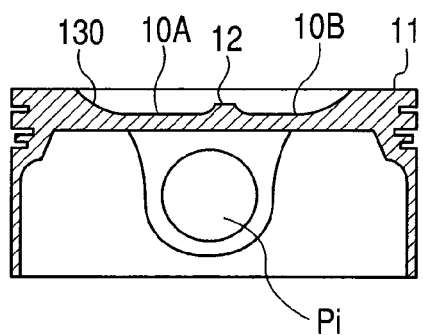
FIG. 28 is a sectional view taken on line B-B in FIG. 26.
Figure 29:
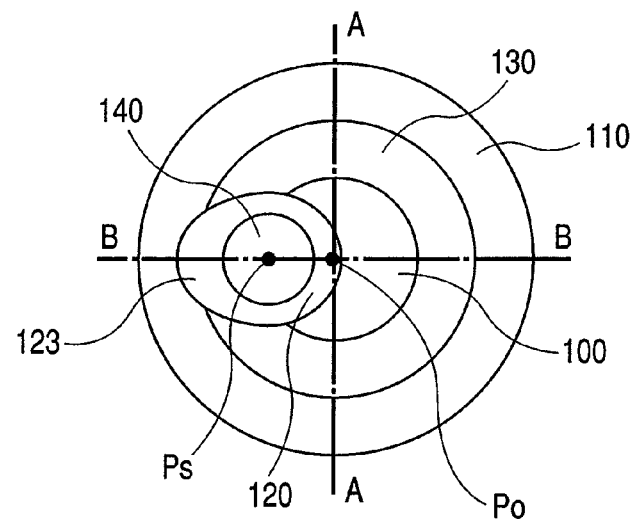
FIG. 29 is a top view showing a fourth example of a piston used in the present invention.
Figure 30:
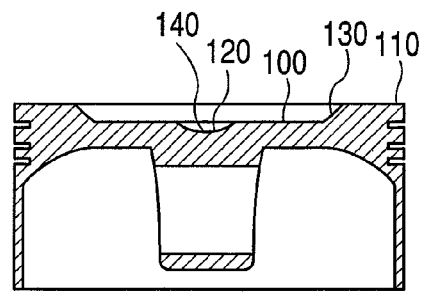
FIG. 30 is a sectional view taken on line A-A in FIG. 29.
Figure 31:
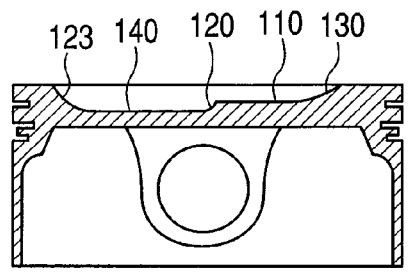
FIG. 31 is a sectional view taken on line B-B in FIG. 29.

In the piston shown in FIGS. 26 to 28, an inner periphery wall portion 130 is formed by rotary grinding up to the vertex position of the prominence portion 12 with a cutting tool having a rotational center corresponding to the center Po of the piston, then cavities 10A and 10B are formed before and behind the prominence portion 12 while allowing the prominence portion 12 to remain by cutting under NC (numerical control). With this shape, the cavity in the piston crown face can partially be formed by rotary cutting, so that the machining becomes simpler. Besides, since semicircular cavities are positioned substantially uniformly before and behind the prominence with respect to the portion wherein the piston pin insertion hole Pi is formed, there is little strain caused by thermal deformation of the piston and no bad influence is exerted on the piston life.

An inner periphery wall portion 130 is formed by rotary grinding up to the position (3 mm in depth) of a stepped portion 100 with a cutting tool having a rotational center corresponding to the center Po of the piston, then the rotational center is moved to Ps on line B-B and an elliptic recess 140 of 2 mm in depth is formed by cutting under NC. As a result, a part 120 of an inner periphery wall 123 of the elliptic recess 140 functions as a protuberant portion corresponding to the prominence portion 12 in the first embodiment. The protuberant portion 120 is formed not rectilinearly but in an arcuate, shape. As a result, the air-fuel mixture 42*b* is formed so as to surround the plug 4.

With this shape, workability is good because machining can be done substantially by performing the rotary grinding twice and there accrues an effect that the air-fuel mixture 42*b* can be distributed in a shape suitable for combustion.

Figure 32:
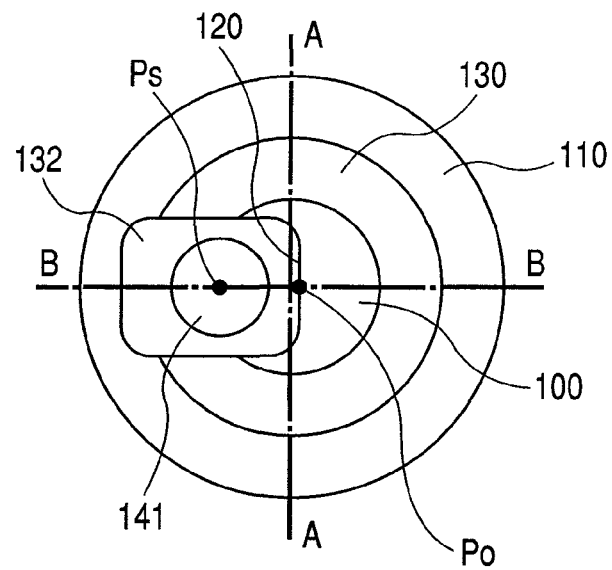
FIG. 32 is a top view showing a fifth example of a piston used in the present invention.
Figure 33:
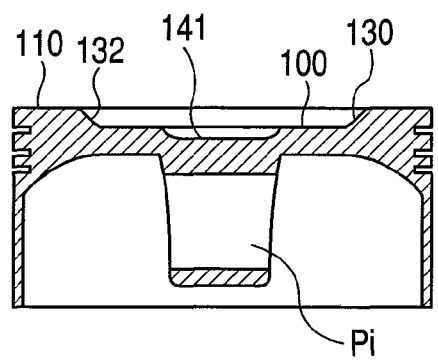
FIG. 33 is a sectional view taken on line A-A in FIG. 32.
Figure 34:
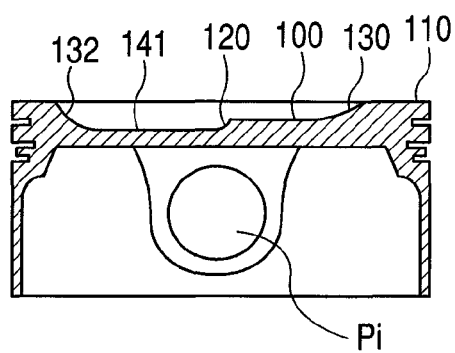
FIG. 34 is a sectional view taken on line B-B in FIG. 32.

In the piston shown in FIGS. 32 to 34, an inner periphery wall portion 130 is formed by rotary grinding up to the position (3 mm in depth) of a stepped portion 100 with a cutting tool having a rotational center corresponding to the center Po of the piston, then the rotational center is moved to Ps on line B-B and a circular recess 141 of 2 mm in depth is formed by rotary cutting, then a rectangular peripheral wall 132 is formed by cutting under NC. As a result, a part 120 of the rectangular inner periphery wall 132 functions as a protuberant portion corresponding to the prominence portion 12 described in the first embodiment. The protuberant portion 120 is formed not rectilinearly but in an arcuate shape. Consequently, the air-fuel mixture 42*b* is formed so as to surround the plug 4, but can be formed in a wide range because the width of the prominence can be made larger than in the embodiment shown in FIGS. 29 to 31.

Figure 35:
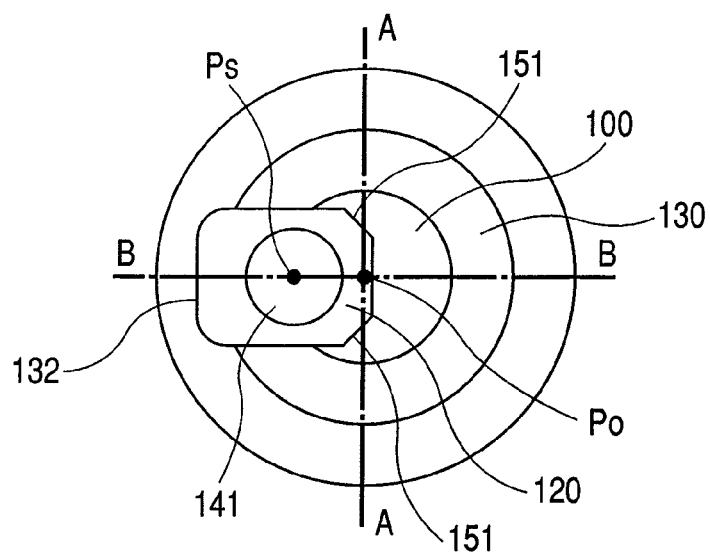
FIG. 35 is a top view showing a sixth example of a piston used in the present invention.
Figure 36:
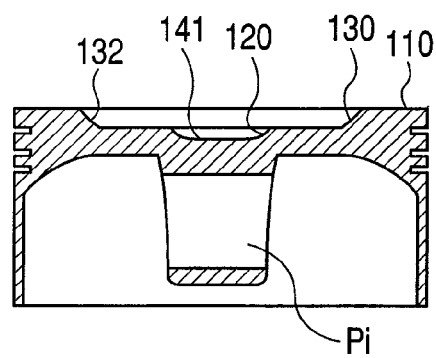
FIG. 36 is a sectional view taken on line A-A in FIG. 35.
Figure 37:
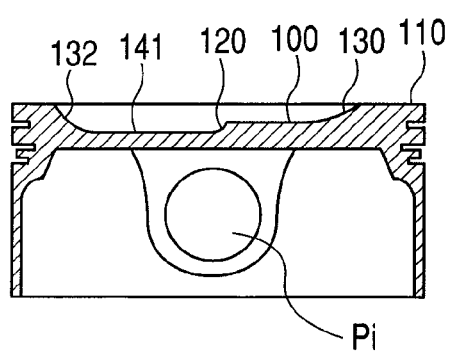
FIG. 37 is a sectional view taken on line B-B in FIG. 35.

The piston shown in FIGS. 35 to 37 is different from the piston shown in FIGS. 32 to 34 in that both sides of the part 120 of the rectangular inner periphery wall 132 of the piston shown in FIGS. 32 to 34 are inclined relatives to line A-A in the case of the piston shown in FIGS. 35 to 37. This difference is effective in that air-fuel mixtures are gathered in the vicinity of the center (around the plug).

The following is a summary of the features of the embodiments described above.

First Embodiment

An in-cylinder injection type engine provided with an injector having a plurality of nozzle holes, and a control unit for the engine, characterized by:

the injector provided at a tip thereof with a plate having a plurality of nozzle holes and installed on an intake side of a combustion chamber;

a spark plug installed in a central upper position of the combustion chamber;

at least one of the nozzle holes formed in the plate and directed to the spark plug;

at least one of the nozzle holes directed to a piston side with respect to the nozzle hole directed to the spark plug on the same plane as the spark plug and the injector;

at least two of the nozzle holes directed to an outer periphery portion of the piston on an intake side;

at least two of the nozzle holes are directed within a directional range of the nozzle holes on the piston side with respect to the nozzle hole directed to the spark plug and on the spark plug side with respect to the nozzle hole directed to the piston side and inside the nozzle holes directed to the outer periphery portion of the piston.

When the injector is seen from an upstream side of a fuel flow path formed in the interior of the injector, the angle between the nozzle hole directed to the spark plug and the tapered surface including the valve seat of the plate is larger than the angle between the nozzle hole directed to the piston and the tapered surface of the plate.

Second Embodiment

An in-cylinder injection type engine provided with an injector having a plurality of nozzle holes, as well as a control unit for the engine, according to the first embodiment, wherein the angle between each of the nozzle holes directed to the outer periphery portion of the piston on the intake side and the tapered surface of the surface is larger than the angle between the nozzle hole directed to the piston and the tapered surface of the plate surface.

Third Embodiment

An in-cylinder injection type engine provided with an injector having a plurality of nozzle holes, as well as a control unit for the engine, according to the first embodiment, wherein when the injector is seen from the upstream side of the fuel flow path formed in the interior of the injector, the following structure is characterized that: at least one nozzle (A) of orifices is directed toward the piston side with respect to a nozzle hole directed toward the sparkplug side, and is directed toward the spark plug with respect to a nozzle hole directed toward the piston side, and is directed within the directional range of nozzle holes directed toward the outer periphery of the piston; an angle between the nozzle hole (A) and the tapered surface of the plate is larger than an angle between the nozzle hole directed to the spark plug and the tapered surface of the plate.

Fourth Embodiment

An in-cylinder injection type engine provided with an injector having a plurality of nozzle holes, as well as a control unit for the engine, according to the first embodiment, characterized in that the amount of fuel injected from the nozzle hole directed to the piston is larger than that of fuel injected from the nozzle hole directed to the spark plug.

Fifth Embodiment

An in-cylinder injection type engine provided with an injector having a plurality of nozzle holes, as well as a control unit for the engine, according to the first embodiment, wherein the amount of fuel injected from the nozzle hole directed to the outer periphery portion of the piston on the intake side is smaller than that of fuel injected from the nozzle hole directed to the piston.

Sixth Embodiment

An in-cylinder injection type engine provided with an injector having a plurality of nozzle holes, as well as a control unit for the engine, according to the first embodiment, wherein when the injector is seen from the upstream side of the fuel flow path formed in the interior of the injector, the following structure is characterized that: at least one nozzle (A) of orifices is directed toward the piston side with respect to a nozzle hole directed toward the spark plug side, and is directed toward the spark plug with respect to a nozzle hole directed toward the piston side, and is directed within the directional range of nozzle holes directed toward the outer periphery of the piston; the amount of fuel from the nozzle hole (A) is larger than the amount of fuel injected from the nozzle hole directed to the spark plug.

Seventh Embodiment

An in-cylinder injection type engine provided with an injector having a plurality of nozzle holes, as well as a control unit for the engine, according to the first embodiment, wherein nozzle holes are comprised of at least a nozzle hole directed to the spark plug, a nozzle hole directed to the piston, a nozzle hole directed to the outer periphery portion of the piston, and a nozzle hole directed within the directional range of the nozzle holes on the piston side with respect to the nozzle hole directed to the spark plug and on the spark plug side with respect to the nozzle hole directed to the piston and inside the nozzle holes directed to the outer periphery portion of the piston. With respect to the nozzle holes, angle of adjacent nozzle holes is equal to or larger than 20°.

The above embodiments can obtain the following functions and effects.

The effects of the embodiments described above are summarized as follows.

In connection with the flow of fuel into each nozzle hole and a fuel inflow angle which is determined by the axis of each nozzle hole formed in a nozzle plate, the fuel inflow angle of the nozzle hole directed to the spark plug is made large compared with the others so as to reduce the effective flow path area, thereby reducing the amount of fuel injected from the nozzle hole directed to the spark plug. As a result, both stable combustion and high exhaust gas temperature can be attained in retard ignition at the time of starting in a cold state. Besides, in a full throttle condition, it is possible to attain high output and low smoke and prevent wear caused by oil dilution.

Thus, it becomes possible to attain both starting in a cold state and a full throttle condition.

Although in the above embodiments the nozzle holes are formed in the plate, no limitation is made thereto, but the nozzle holes may be formed in the tip of the injector nozzle or in the tip of a block integral with a guide portion of the valve element such as a valve needle. Although the valve element described in the above embodiments is a needle valve, there may be used a ball valve. Further, a conical projection may be formed at the extreme tip located downstream of a seating face of the ball valve to decrease the dead volume.

What is claimed is:

1. A fuel injector for an in-cylinder gasoline injection type internal combustion engine, said fuel injector comprising:
    a valve element that is movable in an axial movement direction thereof;
    a valve seat member having a valve seat tapered surface that is inclined relative to said axial movement direction of the valve element, said tapered surface including a seat portion for the valve element; and
    a plurality of fuel injection-nozzle holes provided in seat portion; wherein
    the nozzle holes are formed along respective inclined axes, each of said inclined axes having an inclination angle relative to the axial movement direction of the valve element;
    outlets of the nozzle holes are provided on an outside face of the valve seat member;
    inlets of the nozzle holes are provided on the tapered surface at an inside of the valve seat member to a center of the valve seat member with respect to the seat portion;
    one of the nozzle holes has an inclined axis with an inclination angle that is smallest among the inclination angles of all of the inclined axes; and
    the injector is mounted to the engine with the axis of the nozzle hole having the smallest inclination angle being directed toward a central area of a crown face of a piston in the engine.

2. The injector according to claim 1,
    wherein the injector is mounted to the engine in such a manner that the nozzle hole having the smallest inclination angle positioned closest to a bottom dead center of the piston with respect to any of the other nozzle holes.

3. The injector according to claim 1, wherein the inclined axes of two among the nozzle holes other than the nozzle hole having smallest inclination angle are inclined so as to be spaced apart from each other downwards of the injector and toward both sides of the piston.

4. The injector according to claim 3, wherein the inclined axes of at least two of the nozzle holes are such that a divergent angle between them is smaller than a divergent angle of the two described in claim 3 and directed toward both sides of the piston at positions further apart from the injector.

5. An in-cylinder gasoline injection type internal combustion engine comprising the injector described in claim 1, wherein a slight prominence for guide is formed on a crown face of a piston of said engine so as to convert straight-forward energy of a fuel spray from the fuel nozzle hole directed to the piston crown face into upward flow energy of the fuel spray.

6. The in-cylinder gasoline injection type internal combustion engine according to claim 5, wherein the prominence is formed within a shallow cavity formed in the crown face of the piston.

7. The in-cylinder gasoline injection type internal combustion engine according to claim 5; wherein:
    a plurality of fuel sprays injected from the injector comprises two group, a first group being directed toward a spark plug, and a second group being directed toward the piston; and
    the second group, which is directed toward the piston, comprises at least a pair of sprays directed to opposite sides of the piston crown face at the injector-mounted side with respect to the prominence, at least a pair of sprays directed to opposite sides of the piston crown face at positions distant from the injector-mounted side with respect to the prominence, and at least one spray directed to a central area of the piston crown face at the injector-mounted side with respect to the prominence.

8. The in-cylinder gasoline injection type internal combustion engine according to claim 6; wherein:

the shallow cavity has a rectangular outline in an elongated shape from the injector-mounted side toward an opposite side of the injector-mounted side and is curved so as to be deep centrally and shallow on both injector-mounted side and the opposite side thereof;

a plurality of fuel sprays injected from the injector comprises two groups, a first group being directed toward a spark plug, and a second group being directed toward the piston; and the second group, which is directed toward the piston, comprises at least a pair of sprays directed to opposite sides of the piston crown face outside the cavity of the piston at the injector-mounted side with respect to the prominence, at least a pair of sprays directed to opposite sides of the piston crown face outside the cavity of the piston at positions distant from the injector-mounted side with respect to the prominence, and at least one spray directed to the cavity of the piston at the injector-mounted side with respect to the prominence.

9. The in-cylinder gasoline injection type internal combustion engine according to claim 6, wherein the prominence is formed at a deepest position of the cavity and a height of said prominence is lower than a depth of a deepest position of the cavity.

10. A combustion method for the in-cylinder gasoline injection type internal combustion engine described in claim 5, wherein fuel is injected into the cylinder in an intake stroke of the piston and is allowed to burn homogeneously.

11. A combustion method for the in-cylinder gasoline injection type internal combustion engine described in claim 5, wherein fuel is injected into the cylinder in a compression stroke of the piston and is allowed to burn in a stratified manner.

12. A combustion method for the in-cylinder gasoline injection type internal combustion engine described in claim 5, wherein the fuel is injected from the injector at a specific timing before or after a top dead center of the piston so that a fuel spray from the injector directed to the central part of the piston crown face reaches the crown face at the injector-mounted side with respect to the prominence.

13. A fuel injector for an in-cylinder gasoline injection type internal combustion engine said fuel injector, comprising:

a valve element that is movable in an axial movement direction thereof;

a valve seat member having a tapered surface that is inclined relative to said axial movement direction of the valve element, said tapered surface including a seat portion for the valve element; and a plurality of fuel injection-nozzle holes provided in the seat portion; wherein, the nozzle holes are formed along respective inclined axes, each of said inclined axes having an inclination angle relative to the axial movement direction of the valve element;

outlets are provided on an outside face of the valve seat member;

inlets of the nozzle holes are provided on the tapered surface at an inside of the valve seat member to a center side of the valve seat member with respect to the seat portion;

one of the nozzle holes has an inclined axis with an inclination angle that is largest among the inclination angles of all of the inclined axes; and the injector is mounted to the engine with the axis of the nozzle hole having the largest inclination angle being directed toward a spark plug mounted near the center of a cylinder head in the engine or toward the vicinity thereof.

14. The injector according to claim 13, wherein the injector is mounted to the engine the nozzle hole having the largest inclination angle is positioned farthest from a bottom dead center of the piston with respect to the other nozzle holes.

* * * * *